United States Patent [19]
Luke

[11] Patent Number: 5,228,400
[45] Date of Patent: Jul. 20, 1993

[54] PLANTING TOOL

[76] Inventor: William J. Luke, 4044 E. Lamar Rd., Scottsdale, Ariz. 85253

[21] Appl. No.: 738,174

[22] Filed: Jul. 30, 1991

[51] Int. Cl.$^5$ .............................................. A01C 5/02
[52] U.S. Cl. ...................................... 111/99; 111/92; 172/21
[58] Field of Search ............... 111/92, 89, 98, 99; 172/21, 371

[56] References Cited

U.S. PATENT DOCUMENTS

| 792,891 | 6/1905 | Furbee | 111/99 |
| 2,140,266 | 12/1938 | Leeberg | 111/92 |
| 3,290,821 | 12/1966 | Parry | 111/99 |

FOREIGN PATENT DOCUMENTS

| 65130 | 11/1946 | Denmark | 111/99 |
| 16385 | 1/1882 | Fed. Rep. of Germany | 111/99 |
| 85014 | 3/1895 | Fed. Rep. of Germany | 111/99 |
| 85031 | 5/1920 | Switzerland | 111/99 |
| 156357 | 10/1932 | Switzerland | 111/99 |
| 671192 | 4/1952 | United Kingdom | 111/99 |

Primary Examiner—Randolph A. Reese
Assistant Examiner—Spencer Warnick
Attorney, Agent, or Firm—Robert W. Becker & Associates

[57] ABSTRACT

A planting tool having a handle, a bracket connected to one end of the handle, and a conical portion connected to the bracket remote from the handle. The bracket is open in the manner of a stirrup for accommodating a foot of a person using the tool. The conical portion has a tapered portion that faces away from the bracket.

15 Claims, 2 Drawing Sheets

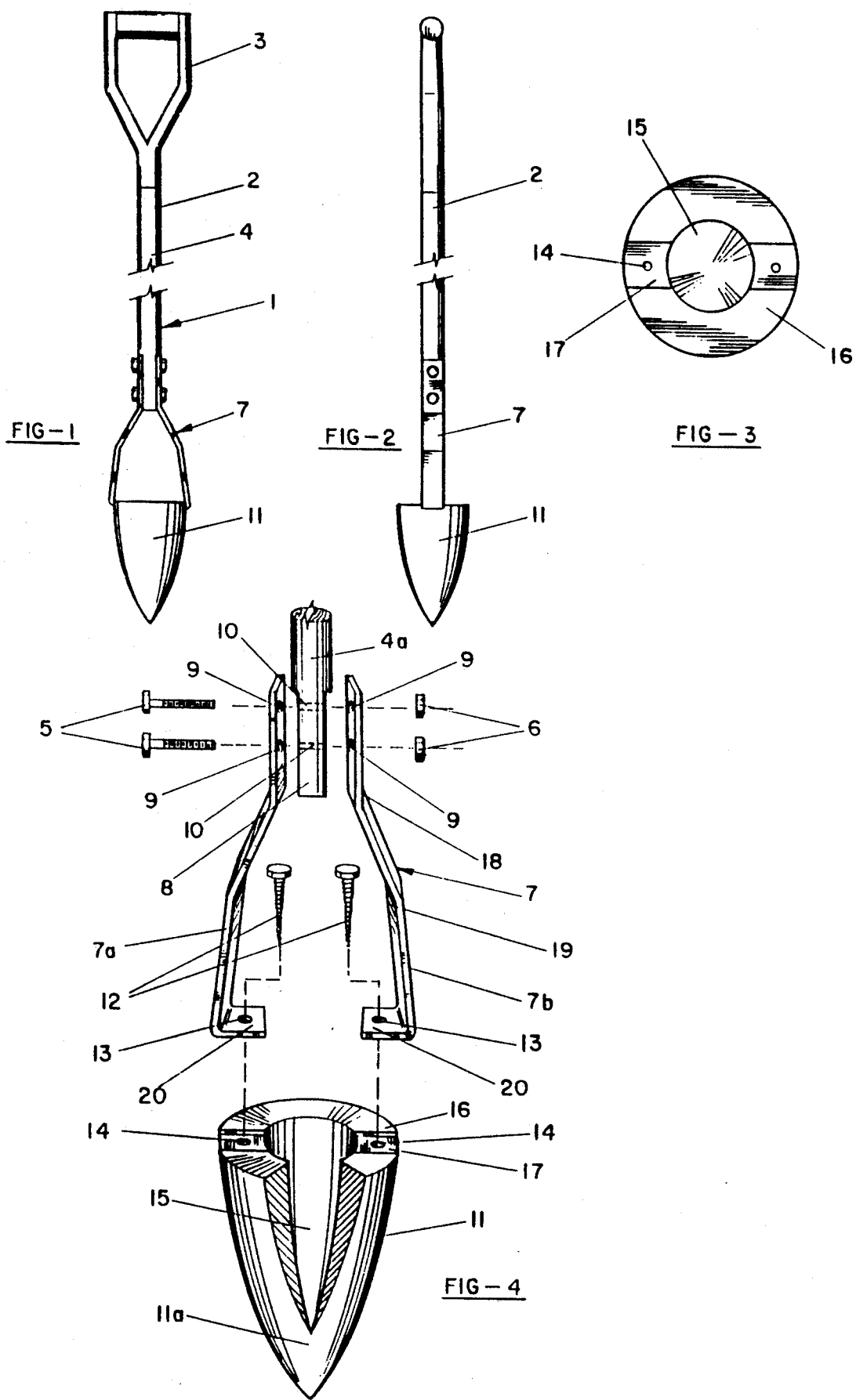

PLANTING TOOL

BACKGROUND OF THE INVENTION

The present invention relates to a planting tool, especially for bedding plants and bulbs, although it would also be suitable for use for seeds.

Planting a garden or other area with bedding plants, bulbs, or seeds is very labor intensive, and up till now has involved hard physical labor as well as necessitating bending down and assuming uncomfortable positions, which is particularly difficult for a person having any physical infirmities.

No tool of which applicants are aware has up till now resolved the aforementioned difficulties encountered when planting bedding plants, bulbs or seeds. For example, the heretofore known tools are either of the spade variety, such as U.S. Pat. No. 385,384, T. Seller, or U.S. Pat. No. 486,713, A. A. Hawes, or are complicated or difficult-to-use devices, such as U.S. Pat. No. 1,439,601, R. F. Boop, or U.S. Pat. No. 4,736,694, Kratky et al. A further device is known, U.S. Pat. No. 4,275,672, Clad, which similarly does not solve the aforementioned problems.

It is therefore an object of the present invention to provide a planting tool that is easy to use, is efficient, has a straightforward construction, and can be used by almost anyone without the need for excessive physical force.

BRIEF DESCRIPTION OF THE DRAWINGS

This object, and other objects and advantages of the present invention, will appear more clearly from the following specification in conjunction with the accompanying schematic drawing, in which:

FIG. 1 is an overall view of one exemplary embodiment of the inventive planting tool;

FIG. 2 is a side view of the tool of FIG. 1;

FIG. 3 is a plan view of the conical portion or actual planter portion of the tool of FIG. 1;

FIG. 4 is an exploded, detailed view of the lower portion of the tool of FIG. 1 showing how the various parts are assembled.

SUMMARY OF THE INVENTION

Figure 1A:
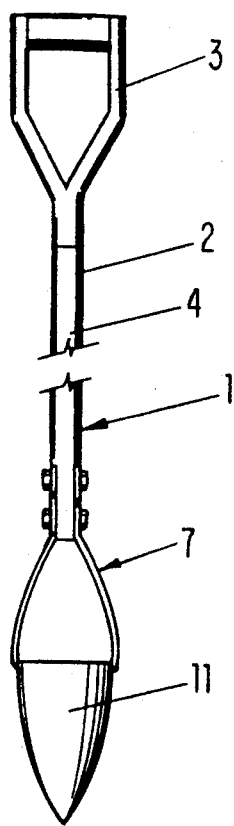
FIG. 1a shows curved or bowed intermediate portions for the bracket means.

The planting tool of the present invention is characterized primarily by: a handle; bracket means that are connected to one end of the handle, with the bracket means being open in the manner of a stirrup for accommodating a foot of a person that is using the tool; and a conical portion that is connected to the bracket means remote from the handle, with the conical portion having a tapered portion that faces away from the bracket means.

Pursuant to one preferred embodiment of the present invention, the conical portion is hollow and has a ring-shaped planar surface at an end thereof that is remote from the tapered portion, with the ring-shaped planar surface being open in the middle, and with the tapered portion being closed off. The bracket means preferably comprises two separate pieces, each of which is connected both to the handle and to the ring-shaped planar surface of the conical portion.

To use the inventive planting tool, the soil is first prepared. This can be done either by tilling the soil, or, if this is inconvenient or time does not permit, the soil can be well soaked. Thereupon, the conical portion of the tool, which forms the actual planter portion or hole-making portion, is placed at an appropriate site where it is desired to place a bedding plant, bulb, or seed. The user then places a foot in the stirrup-like opening that is formed by the bracket means, with the foot resting upon the top of the conical portion. The user thereupon presses upon the conical portion with enough force to make a hole of the desired size. Since the overall tool is of such a length that a user can comfortably use the same without having to bend over, the inventive planting tool is very easy on a person's back. At the same time, the inventive planting tool permits a larger number of holes to be made in a very short period of time.

Since the conical portion is typically several inches long, a large variety of hole sizes can be obtained. The user merely presses down on the conical portion with the foot with enough force to obtain the desired size hole. If a hole is desired that is larger than the conical portion, either to accommodate larger bulbs or plants, or to provide a deeper well for the later watering of the plants, it is merely necessary once the conical portion has been pressed into the ground to move the entire tool either back and forth and/or in a circular manner to thereby enlarge the hole.

The inventive planting tool, in a very straightforward and advantageous manner, provides a device for quickly and easily producing holes of any desired size for bedding plants, bulbs and seeds. Since the inventive tool is used in an upright position of the user, without the need, for example, of having to actually shovel dirt out of the intended hole, very little physical labor is involved and the tool can be used by nearly everyone.

Further specific features of the present invention will be described in detail subsequently.

DESCRIPTION OF PREFERRED EMBODIMENTS

Figure 4A:
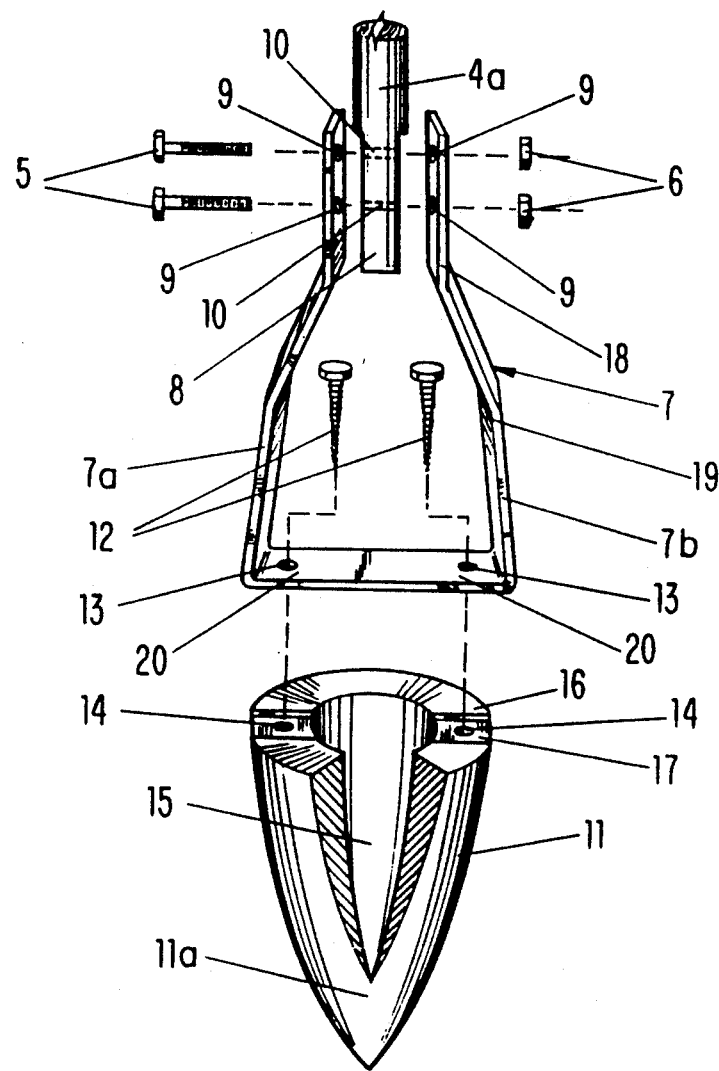
FIG. 4a shows a closed end portion for the bracket means.

Referring now to the drawing in detail, which shows the presently preferred specific embodiment, the inventive planting tool is designated by the reference numeral 1. The tool 1 includes a handle 2 that is made of any suitable material, such as wood, although the handle can also be made of plastic or even metal. A grip portion 3 is connected to one end of a shank portion 4 of the handle 2. Connected to the other end 4a of the shank portion 4 via bolts 5 and nuts 6 is a bracket means 7. In the illustrated embodiment, and in particular as shown in FIG. 4, the bracket means 7 comprises two identical pieces 7a and 7b, which are connected to the end 4a of the shank portion 4, and in particular at flattened portions 8 provided on opposite sides of the end 4a. For this purpose, the upper portion of the pieces 7a, 7b of the bracket means 7 are provided with holes 9, with the bolts 5 being inserted through the holes 9 of one of the bracket pieces, for example the piece 7a, and then through holes 10 provided in the end 4a of the shank portion 4, and finally through the holes 9 in the other bracket piece, for example the piece 7b.

Connected at the lower end of the bracket means is the actual planter or hole-making portion of the tool, which is in the form of the conical portion 11. This conical portion is provided with a tapered portion 11a, which preferably has a smooth surface to facilitate use thereof. In the illustrated embodiment, the bracket means 7 and the conical portion 11 are interconnected via screw means 12 that extend through holes 13 that are provided in the bracket pieces 7a, 7b, and are then inserted into holes 14 that are provided in the conical portion 11.

Although the conical portion 11 could be a solid part, in the preferred embodiment illustrated in the drawings, the conical portion 11 is hollow, in other words, is provided with a hollowed-out portion 15. In particular where the conical portion 11 is made of metal, such as cast aluminum, the hollowed-out portion 15 not only saves material, but keeps the conical portion from getting unduly heavy. As can be further seen in particular from the view of FIG. 4, the conical portion 11, at that end that is remote from the tapered portion 11a and is connected to the bracket means 7, is provided with a ring-shaped planar surface 16, which of course is open in the middle portion. To provide for a more finished appearance, the ring-shaped planar surface 16 can be provided on opposite sides with recessed areas 17 for receiving angled ends of the bracket pieces 7a, 7b.

Although the bracket means 7 could be a single-piece element, as discussed above in the preferred embodiment the bracket means 7 comprises the two pieces 7a and 7b. Each of these bracket pieces has a first end portion 18 that extends essentially parallel to the handle 2 and is connected to the end 4a of the shank portion 4 thereof, and in particular to the flattened portion 8 of the shank portion end 4a so that the portions 18 will be somewhat recessed and won't protrude so far. For this purpose, each first end portion 18 is provided with the holes 9 for receiving the bolts 5. Adjoining the first end portion 18 is an intermediate portion 19, with the intermediate portions of the two bracket pieces 7a, 7b diverging from one another in a direction toward the conical portion 11 in order to form a stirrup-like opening for accommodating a foot of a person that is using the tool. In the illustrated embodiment, each intermediate portion 19 is shown as being angled, but could also be a straight piece or could be bowed or curved. The important thing with both a bowed configuration and the illustrated angled configuration is that the intermediate portion be curved or angled outwardly in order to maximize the open space for forming the aforementioned stirrup for receiving a users foot.

Adjoining each intermediate portion 19 is a second end portion 20 that is bent inwardly toward the opposite bracket piece 7a, 7b. Each end portion 20 is connected to the ring-shaped planar surface 16 of the conical portion 11. For this purpose, the second end portions 20 are provided with the holes 13 for receiving the screw means 12 therethrough. If the recessed areas 17 are provided, they preferably have such a depth that the end portions 20 are fully received therein so as to be flush with the planar surface 16.

It is to be understood that where the bracket means 7 is of one-piece construction, the second end portions 20 would be interconnected over the hollowed-out portion 15. However, the two-piece construction of the bracket means 7 is preferred because it makes the tool easier to manufacture and assemble since with the two bracket pieces unavoidable manufacturing tolerances can be more easily accommodated during assembly.

As shown in FIG. 1, to facilitate use of the inventive planting tool, the handle, and in particular the grip portion 3 thereof, and the stirrup-like opening of the bracket means 7 are aligned with one another.

Both the conical portion 11 and the bracket means 7 can be made of any suitable material, especially of a metal or a plastic. The conical portion 11 is preferably made of cast aluminum, whereas the bracket means is preferably made of steel. It would even be possible to make the bracket means and the conical portion as an integral piece, especially where they are made of a suitable hard plastic.

The present invention is, of course, in no way restricted to the specific disclosure of the specification and drawing, but also encompasses any modifications within the scope of the appended claims.

What we claim is:

1. A planting tool, comprising:
   a handle having a single elongated shank portion with a longitudinal axis;
   bracket means connected to one end of said shank portion, with said bracket means extending from said shank portion and being open in the manner of a stirrup for accommodating a foot of a person using said tool; and
   a single conical portion having a central longitudinal axis, said conical portion being connected to said bracket means remote from said shank portion, with the longitudinal axis of said conical portion being aligned with the longitudinal axis of said shank portion and having a tapered portion that faces away from said bracket means.

2. A planting tool according to claim 1, wherein said conical portion is hollow and includes a ring-shaped planar surface at an end thereof that is remote from said tapered portion, with said ring-shaped planar surface being open in the middle, and with said tapered portion being closed off.

3. A planting tool according to claim 2, wherein said conical portion is made of a material selected from the group consisting of metals and plastics.

4. A planting tool according to claim 3, wherein said conical portion is made of aluminum.

5. A planting tool according to claim 2, wherein said bracket means comprises two separate pieces, each of which is connected to both said handle and said conical portion.

6. A planting tool according to claim 5, wherein each of said pieces of said bracket means has, in succession: a first end portion that extends essentially parallel to said handle and is connected to said one end thereof; an intermediate portion, with said intermediate portions of said two pieces diverging from one another in a direction toward said conical portion to form said stirrup-like opening of said bracket means; and a second end portion that is bent inwardly toward said other piece and is connected to said ring-shaped planar surface of said conical portion.

7. A planting tool according to claim 6, wherein said inwardly bent second end portion of each of said pieces of said bracket means terminates prior to said open middle portion of said ring-shaped planar surface of said conical portion.

8. A planting tool according to claim 6, wherein each of said intermediate portions of said pieces of said bracket means is angularly bent outwardly.

9. A planting tool according to claim 6, wherein each of said intermediate portions of said pieces of said bracket means is bowed outwardly in a curved manner.

10. A planting tool according to claim 5, wherein said bracket means is made of a material selected from the group consisting of metals and plastics.

11. A planting tool according to claim 10, wherein said bracket means is made of steel.

12. A planting tool according to claim 1, wherein said conical portion is a solid part.

13. A planting tool according to claim 1, wherein said bracket means is a one-piece member including, in succession: a first open end portion comprising two elements that each extend essentially parallel to said handle and are connected to said one end thereof; two intermediate portions each adjoining one of said two elements of said first open end portion, with said intermediate portions diverging from one another in a direction toward said conical portion to form said stirrup-like opening of said bracket means; and a second closed end portion comprising an element that interconnects said intermediate portions and is connected to said conical portion.

14. A planting tool according to claim 1, wherein said handle includes: a grip portion that is disposed at an end of said shank portion remote from said bracket means.

15. A planting tool according to claim 1, wherein said bracket means and said conical portion are an integral piece.

* * * * *